US008220978B2

(12) United States Patent
Shiau et al.

(10) Patent No.: US 8,220,978 B2
(45) Date of Patent: Jul. 17, 2012

(54) BRIGHTNESS ENHANCEMENT FILM AND BACKLIGHT MODULE

(75) Inventors: Tzeng-Ke Shiau, Hsinchu (TW);
Ching-Shiang Li, Hsinchu (TW);
Wen-Chih Huang, Hsinchu (TW);
Fu-Ming Chuang, Hsinchu (TW);
Kuo-Tung Tiao, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 302 days.

(21) Appl. No.: 12/801,045

(22) Filed: May 19, 2010

(65) Prior Publication Data
US 2010/0309682 A1    Dec. 9, 2010

(30) Foreign Application Priority Data

Jun. 4, 2009 (TW) ................................ 98118580 A (51) Int. Cl.
*F21V 7/04* (2006.01)
*H01J 63/04* (2006.01)
*H01J 1/62* (2006.01)

(52) U.S. Cl. ........ 362/607; 362/610; 362/600; 362/606; 362/620; 313/512; 313/110

(58) Field of Classification Search ........................ None
See application file for complete search history.

(56) References Cited

U.S. PATENT DOCUMENTS

| 7,527,410 B2* | 5/2009 | Yoshizawa et al. | 362/615 |
| 7,665,877 B2* | 2/2010 | Lee et al. | 362/608 |
| 7,706,073 B2* | 4/2010 | Munro | 359/627 |
| 7,990,490 B2* | 8/2011 | Lee et al. | 349/62 |
| 2007/0002452 A1 | 1/2007 | Munro | |
| 2009/0067177 A1* | 3/2009 | Kung | 362/309 |
| 2011/0058389 A1* | 3/2011 | Shiau et al. | 362/607 |

FOREIGN PATENT DOCUMENTS

TW        200911513        3/2009

* cited by examiner

*Primary Examiner* — Natalie Walford
(74) *Attorney, Agent, or Firm* — Bacon & Thomas, PLLC (57) ABSTRACT

A brightness enhancement film (BEF) includes a light transmissive substrate having a first surface and a second surface, a plurality of lenses disposed on the first surface, and a reflective layer. Each of the lenses has a curved protruding surface facing away from the light transmissive substrate. The radius of curvature of the curved protruding surface in a first direction parallel to the first surface is $R_1$, the radius in a second direction is $R_2$, and $R_1 \neq R_2$. The reflective layer is disposed on the second surface and has a plurality of light pass openings respectively located on the optical axes of the lenses. The distance between the apex of the curved protruding surface and the corresponding light pass opening is L, the refractive index of the lenses is n, and the BEF satisfies $L<nR_1/(n-1)$ and $L<nR_2/(n-1)$. A backing light module using the BEF is provided.

20 Claims, 8 Drawing Sheets

BRIGHTNESS ENHANCEMENT FILM AND BACKLIGHT MODULE

CROSS-REFERENCE TO RELATED APPLICATION

This application claims the priority benefit of Taiwan application serial no. 98118580, filed on Jun. 4, 2009. The entirety of the above-mentioned patent application is hereby incorporated by reference herein and made a part of this specification.

BACKGROUND OF THE INVENTION

1. Field of the Invention

The invention generally relates to an optical film and a light source module using the optical film, and more particularly, to a brightness enhancement film (BEF) and a backlight module using the BEF.

2. Description of Related Art

Along with the development of display technology, flat panel display has become the main stream of display to take place of conventional, thick and heavy cathode ray tube (CRT). In flat panel display, liquid crystal display (LCD) is popular with people, and widely used. The LCD includes a liquid crystal panel and a backlight module. The liquid crystal panel may not emit light, and is used to determine light transmission rate, so a backlight module is disposed behind the liquid crystal panel and used as a flat surface light source of the liquid crystal panel. The optical quality of the flat surface light source greatly affects the display quality of the LCD. For example, in order to make the display image to be correctly displayed and have little distortion, a uniform flat panel light source is needed. Moreover, in order to improve the brightness of the display image, the range of the light emitting angle of the flat panel source may also be limited to avoid the lose of the light.

A conventional side type backlight module has a light guide plate, besides, a lower diffuser, two prism sheets with prism rods perpendicular to each other, and a upper diffuser are arranged on the light guide plate in sequence from down to up, wherein the prism sheets are used to minimize the range of the light emitting angle, also the upper diffuser and the lower diffuser are used to make the light uniform and to avoid producing moiré between the outline of the prism rods and the liquid crystal panel. However, the method of disposing four optical films on the light guide plate may increase the cost of the backlight module and too many optical films may make assembly difficult and be difficult to reduce the thickness of the backlight module.

In addition, the Taiwan patent publication number 200911513 discloses an optical film structure disposed on the light guide plate. The optical film structure has a light transmissive body and a reflective layer disposed on the light incident surface of the light transmissive body, and a lens array is disposed on the light emitting surface of the light transmissive body. Moreover, an opening corresponding to the lens is disposed at the reflective layer. In addition, the American publication number 20070002452 also discloses the same type optical film structure. However, to the different demands of brightness distribution at different angles in different directions, the backlight modules of the liquid crystal display of different electronic equipments (such as mobile phone, notebook computer, monitor TV and other liquid crystal display) using the optical film structures of the two above mentioned patent have difficulty to make the range of the light emitting angle change with the changing of the direction, so the design concepts of the mentioned patents above are difficult to apply to different kinds of electronic equipments at the same time.

SUMMARY OF THE INVENTION

The invention provides a brightness enhancement film (BEF) capable of making the light beam through the BEF have different light emitting angles in two different directions, and be manufactured easily.

The invention provides a backlight module having low cost and good optical character, easy to be assembled, and apply to different kinds of electronic equipments.

Other advantages of the invention may be further indicated by the disclosures of the invention.

To achieve at least one of the objectives, one embodiment of the invention provides a light enhancement film (BEF) including a light transmissive substrate, a plurality of lenses, and a reflective layer. The light transmissive substrate has a first surface and a second surface opposite to the first surface. The lenses are disposed on the first surface, wherein each of the lenses has a curved protruding surface facing away from the light transmissive substrate. The radius of the curved protruding surface in a first direction parallel to the first surface is R1, the radius of the curved protruding surface in a second direction parallel to the first surface is R2, and $R_1 \neq R_2$. The reflective layer is disposed on the second surface, wherein the reflective layer has a plurality of light transmissive openings, and the light transmissive openings are respectively located on the optical axes of the lenses. The distance between the apex of the curved protruding surface of the lens and the corresponding light transmissive opening is L, the refractive index of the lenses is n, and the BEF satisfies $L<nR_1/(n-1)$ and $L<nR_2/(n-1)$.

In one embodiment of the invention, the first direction is substantially perpendicular to the second direction. The widths of the light transmissive openings in the first direction are not the same as the widths of the light transmissive openings in the second direction. The width of the light transmissive opening in the first direction is $A_1$, the width of the light transmissive opening in the second direction is $A_2$, the width of the curved protruding surface corresponding to the light transmissive opening in the first direction is $P_1$, the width of the curved protruding surface corresponding to the light transmissive opening in the second direction is $P_2$, and the BEF satisfies $0.1<A_1/P_1<0.9$ and $0.1<A_2/P_2<0.9$.

In one embodiment of the invention, the widths of at least a part of the lenses are not the same in the first direction. The ratio of the maximum value of the widths of the lenses to the minimum value of the widths of the lenses in the first direction is, for example between 1 and 4. The widths of at least a part of the lenses are not the same in the second direction. The ratio of the maximum value of the widths of the lenses to the second direction is, for example, between 1 and 4. The BEF may further include a light transmissive layer covering the reflective layer and being filled in the light transmissive openings. The BEF satisfies $L<0.95nR_1/(n-1)$ and $L<0.95nR_2/(n-1)$.

Another embodiment of the invention provides a backlight module including at least a light emitting device, above mentioned BEF and an optical unit. The light emitting device is capable of emitting a light beam. The BEF is disposed in the transmission path of the light beam. The optical unit is disposed in the transmission path of the light beam between light emitting device and the BEF.

In one embodiment of the invention, the optical unit includes a light guide plate having a third surface, a fourth surface opposite to the third surface and a light incident surface connecting the third surface and the fourth surface. The reflective layer may be located between the light transmissive substrate and the third surface, and the light emitting device may be disposed besides the light incident surface. The light transmissive layer may be disposed between the reflective layer and the optical unit.

In the BEF of the embodiment of the invention, for $R_1 \neq R_2$, the BEF may be used in the backlight module having different demands at the ranges of light emitting angle in different directions. By appropriately designing the values of $R_1$ and $R_2$, the backlight module using the BEF may be used in different kinds of display. Moreover, in the embodiment of the invention, the BEF satisfies $L<nR_1/(n-1)$ and $L<nR_2/(n-1)$, so in manufacturing process, when the parallel laser beam perpendicular to the first surface transmits to the lens by the technique of laser drilling and the laser beam is concentrated to the reflective layer by lens and produces a light spot, the illumination distribution of the light spot may be more uniform. In that way, just once drilling action using parallel laser beam, the light transmissive openings having prospective dimension and position may be drilled out, so the BEF of the embodiment of the invention may simplify the manufacturing process, so that the cost of the embodiment of the backlight module may be reduced. Moreover, when the BEF satisfies $L<nRi/(n-1)$ and $L<nR_2/(n-1)$, the light beam through the BEF may become more ur form, then the backlight module of the embodiment of the invention may provide more uniform surface light.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIG. 1A, FIG. 1B, FIGS. 2A and 2B, the backlight module 100 of the embodiment includes a light emitting device 110, a beam enhancement film (BEF) 200, and an optical unit 300. The light emitting device 110 is capable of emitting a light beam 112. In the embodiment, the light emitting device 110 is, for example, a cold cathode fluorescent lamp (CCFL). However, in other embodiment, the backlight module may have a plurality of light emitting devices, for example, light emitting diodes (LEDs) arranged in a straight line.

Figure 1A:
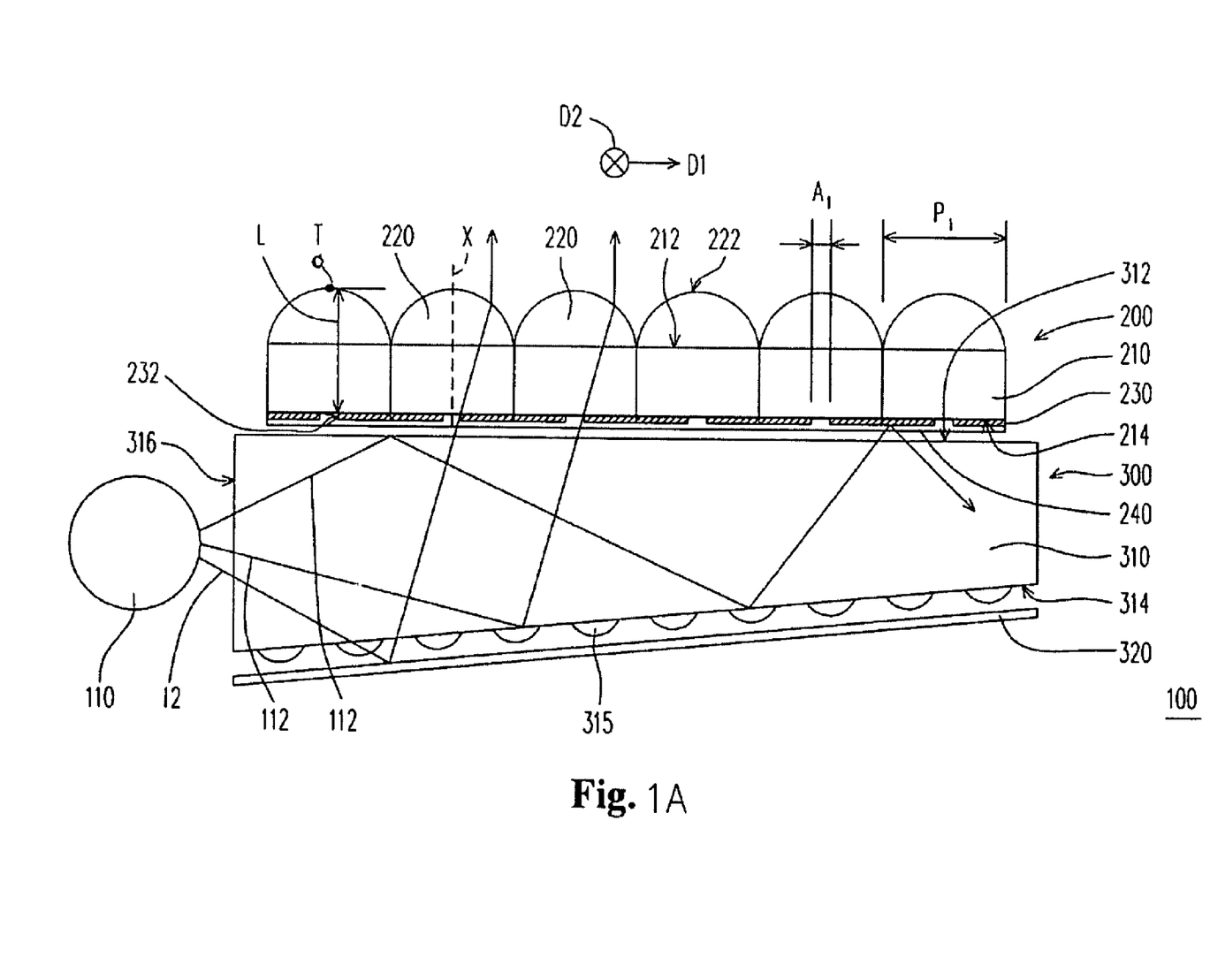
FIG. 1A and FIG. 1B are cross-sectional diagrams of a backlight module of an embodiment of the invention in two different directions perpendicular to each other.
Figure 1B:
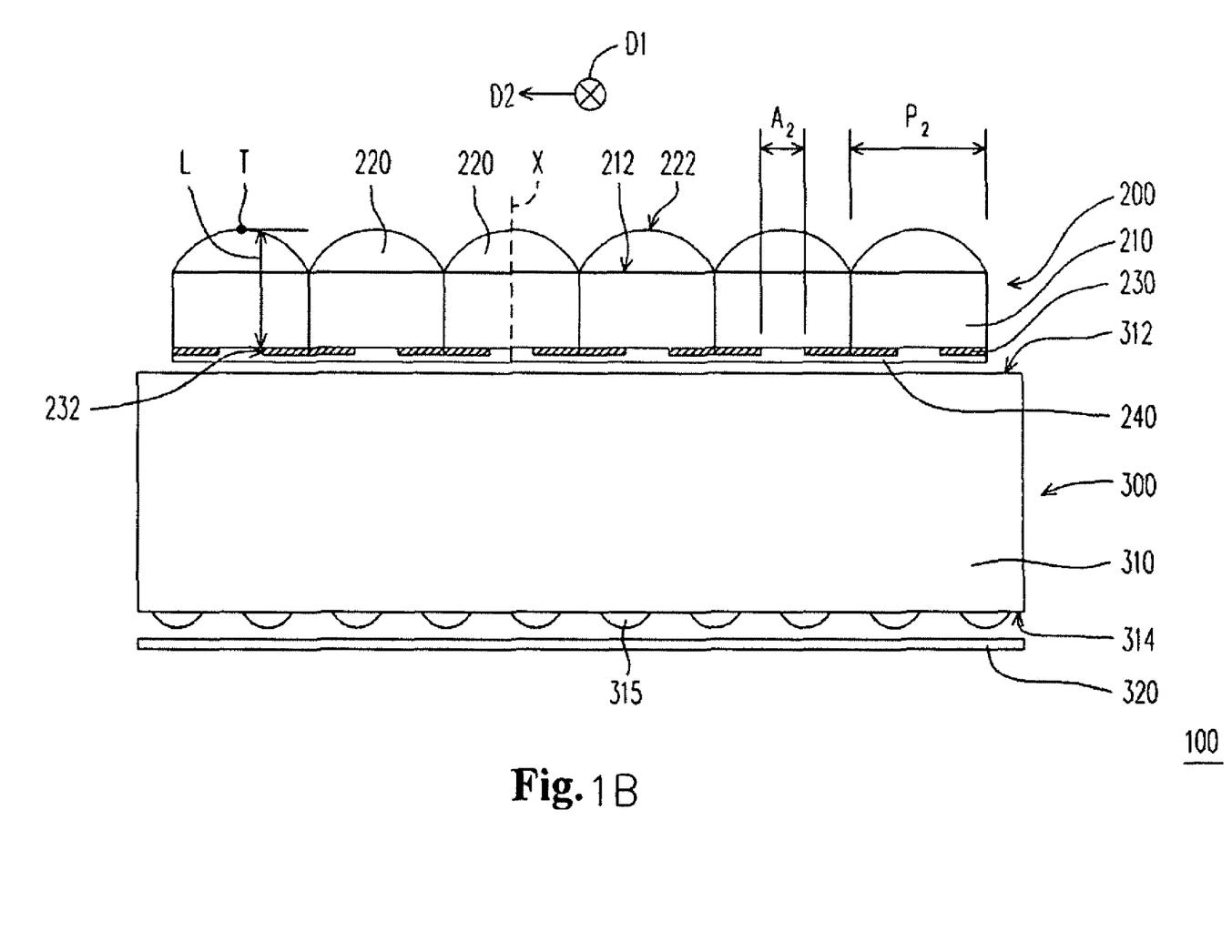

The BEF 200 is disposed in the transmission path of the light beam 112. The optical unit 300 is disposed in the transmission path of the light beam 112 between the light emitting device 110 and the BEF 200. In the embodiment, the optical unit 300 includes a light guide plate 310 having a surface 312, a surface 314 opposite to the surface 312, and a light incident surface 316 connecting the surface 312 and the surface 314. The light emitting device 110 may be disposed besides the light incident surface 316. Specifically, the light beam 112 emitted from the light emitting device 110 may transmit to the light guide plate 310 through the light incident surface 316, and the light beam 112 may be confined in the light guide plate 310 through being totally internally reflected by the surface 312 and the surface 314. However, the microstructure 315 on the surface 314 of the light guide plate 310 may destroy the total internal reflection. For example, a part of the light beam 112 may be reflected to surface 312 by the microstructure 315 and transmit through the surface 312. The other part of the light beam 112 may penetrate the microstructure 315 and transmit to a reflective plate 320 disposed at one side of the surface 314. The light beam 112 may be reflected by the reflective plate 320 and penetrate the surface 314 and the surface 312 in sequence.

The BEF 200 includes a light transmissive substrate 210, a plurality of lenses 220, and a reflective layer 230. The transmissive layer 210 has a second surface 214 and a first surface 212 opposite to each other. The lenses 220 are disposed on the first surface 212, wherein each of the lenses 220 has a curved protruding surface 222 facing away from the light transmissive substrate 210. The radius of the curvature of the curved protruding surface 222 in a first direction D1 parallel to the first surface 212 is $R_1$, the radius of the curvature of the curved protruding surface 222 in a second direction D2 parallel to the first surface 212 is $R_2$, and $R_1 \neq R_2$. In the embodiment, the curved protruding surface 222 may be smooth curved surface, or the curved protruding surface 222 may consist of a plurality of tiny straight line segment or curved line segment. Besides, the first direction D1 is substantially perpendicular to the second direction D2. The reflective layer 230 is disposed on the second surface 214, wherein the reflective layer 230 has a plurality of light transmissive openings 232, and the light transmissive openings 232 are disposed on the axis X of the lenses 220. In the embodiment, the reflective layer 230 may be disposed between the light transmissive substrate 210 and the surface 312. The distance between the apex T of the curved protruding surface 222 of the lenses 220 and the corresponding light transmissive opening 232 is L, and the refractive index of the lenses 220 is n, and the BEF 200 satisfies $L<nR_1/(n-1)$ and $L<nR_2/(n-1)$.

When the light emitting angle of the light beam 112 emitting from the surface 312 is too big, most part of the light beam 112 may be reflected to the light guide plate 310 by the reflective layer 230 and be used again. When the light emitting angle of the light beam 112 departing from the surface 312 is small, more proportion of light beam 112 may be through the light transmissive openings 232. The light energy distribution of the light beam 112 through the light transmissive openings 232 is, for example, approximate Gauss distribution, and the light beam 112 may be concentrated by the lenses 220 and be emitted out from the lenses 220 in an angle approximately perpendicular to the first surface 212. Thus the backlight module 100 of the embodiment may reduce the range of the light emitting angle by one single optical film (the BEF 200), then the illumination of the liquid display is improved, and the backlight module 100 may not adopt four optical films as used in prior art.

Besides, in the BEF 200 of the embodiment, for $R_1 \neq R_2$, the BEF may be used in the backlight module having different demands at the ranges of the light emitting angle in different directions. Through appropriate designing of the values of $R_1$ and $R_2$, the backlight module adopting the BEF 200 may be used in different kinds of display of the electronic equipment, such as mobile phone, notebook, monitor, TV and other equipments using liquid crystal display.

Figure 2A:
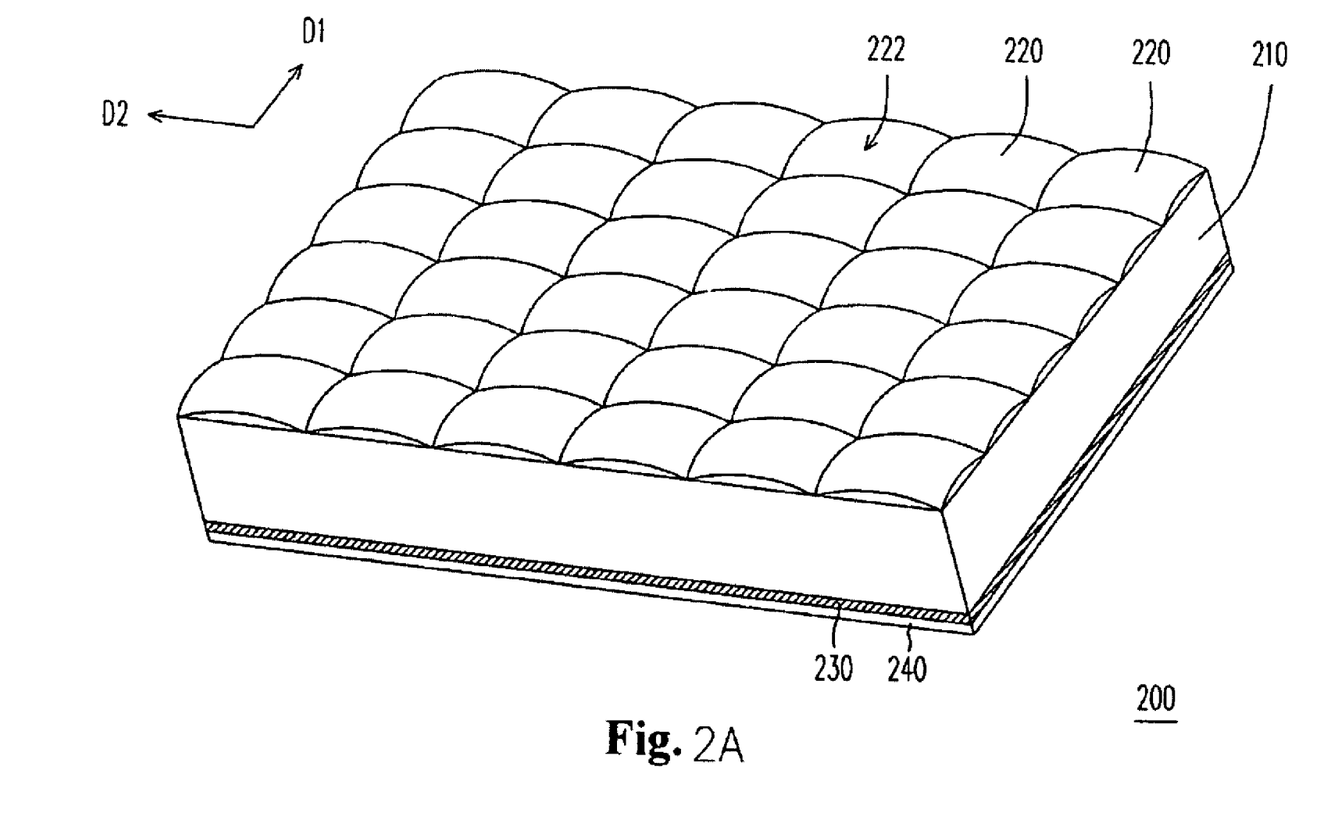
FIG. 2A is a stereogram of the brightness enhancement film (BEF) in FIG. 1A.
Figure 2B:
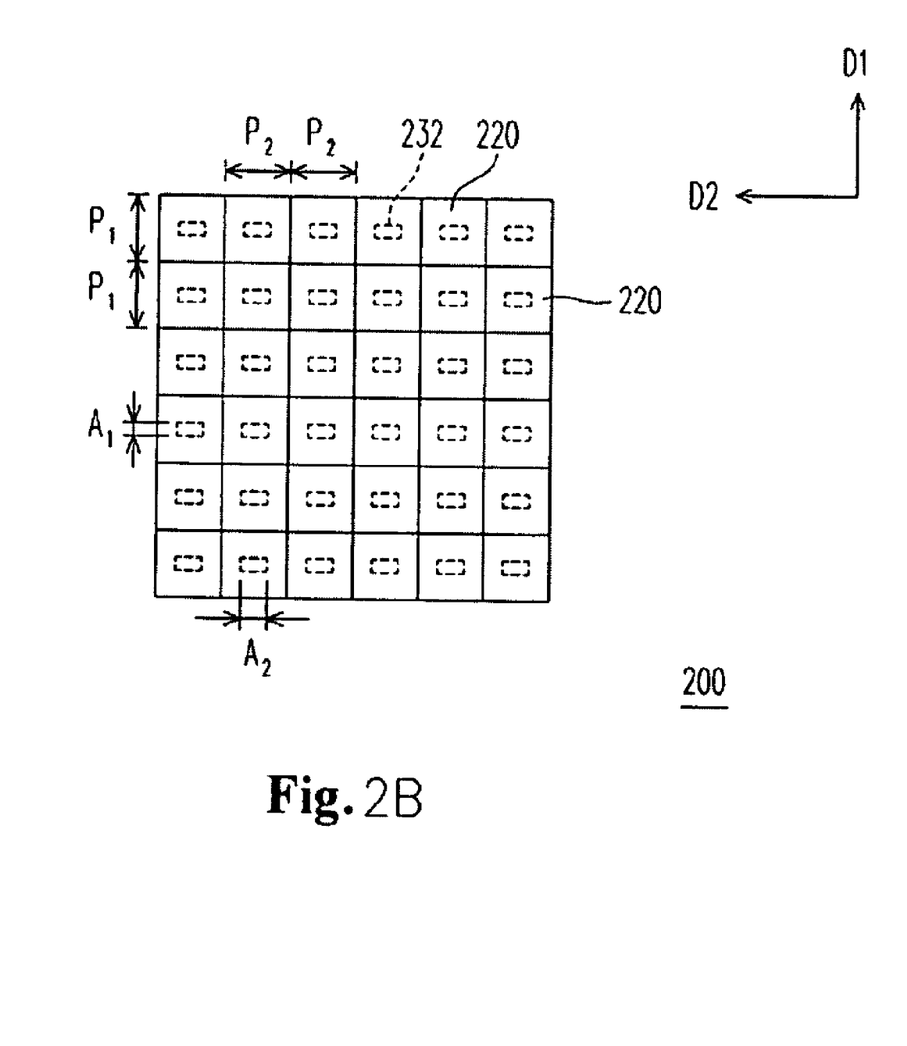
FIG. 2B is a bottom view diagram of the BEF in FIG. 1A.

In the embodiment, the widths of the light transmissive openings 232 in the first direction D1 are not the same as the widths of the light transmissive openings 232 in the second direction D2. Besides, the width of the light transmissive opening 232 in the first direction D1 is $A_1$, the width of the light transmissive opening 232 in the second direction is $A_2$, the width of the curved protruding surface 222 corresponding to the light transmissive opening 232 in the first direction D1 is $P_1$, the width of the protruding surface 222 corresponding to the light transmissive opening 232 in the second direction D2 is $P_2$, and the BEF 200 may satisfies $0.1<A_1/P_1<0.9$ and $0.1<A_2/P_2<0.9$. Thus the range of the light emitting angle in the first direction D1 and the range of the light emitting angle in the second direction D2 may have great variation, so that the BEF 200 and the backlight module 100 may be used more widely.

Figure 3A:
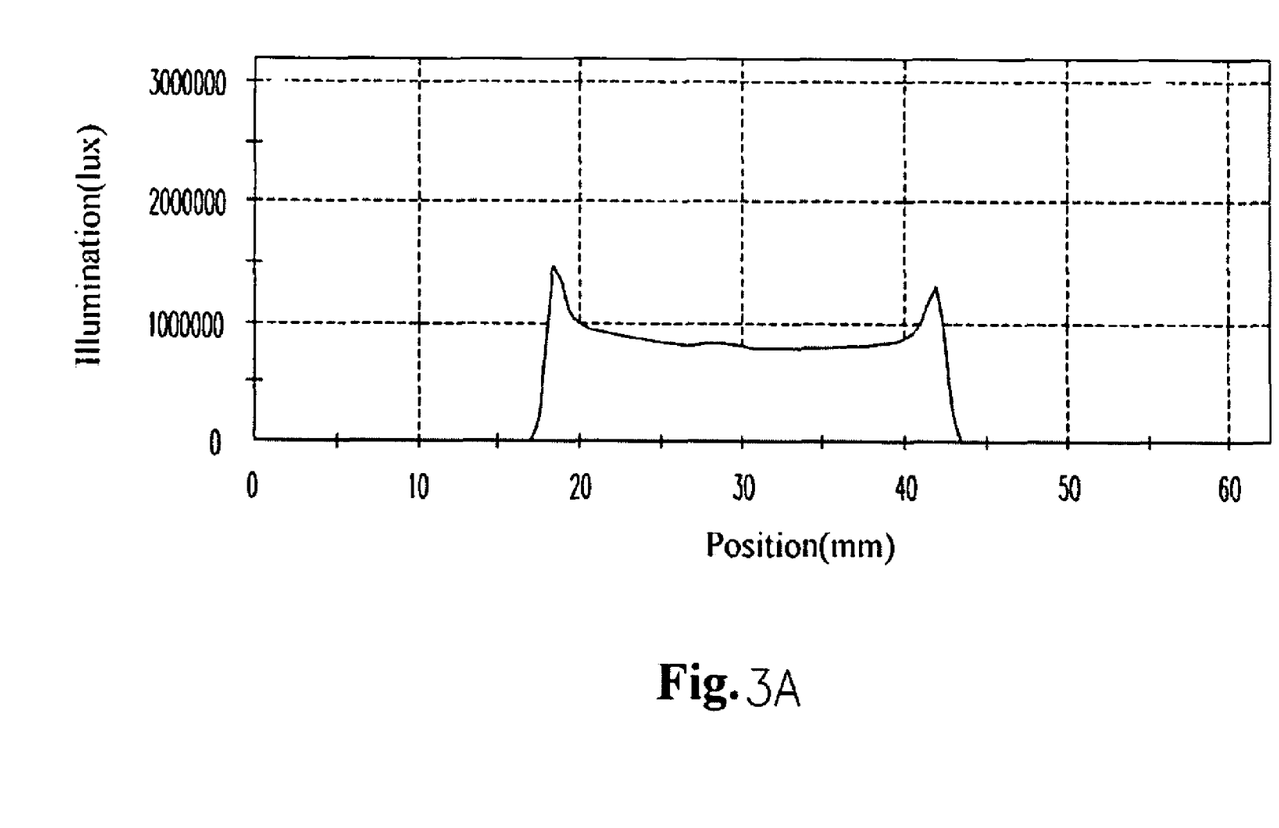
FIG. 3A is a diagram showing the illumination distribution of light spot in laser drilling process of the BEF in FIG. 1A.
Figure 3B:
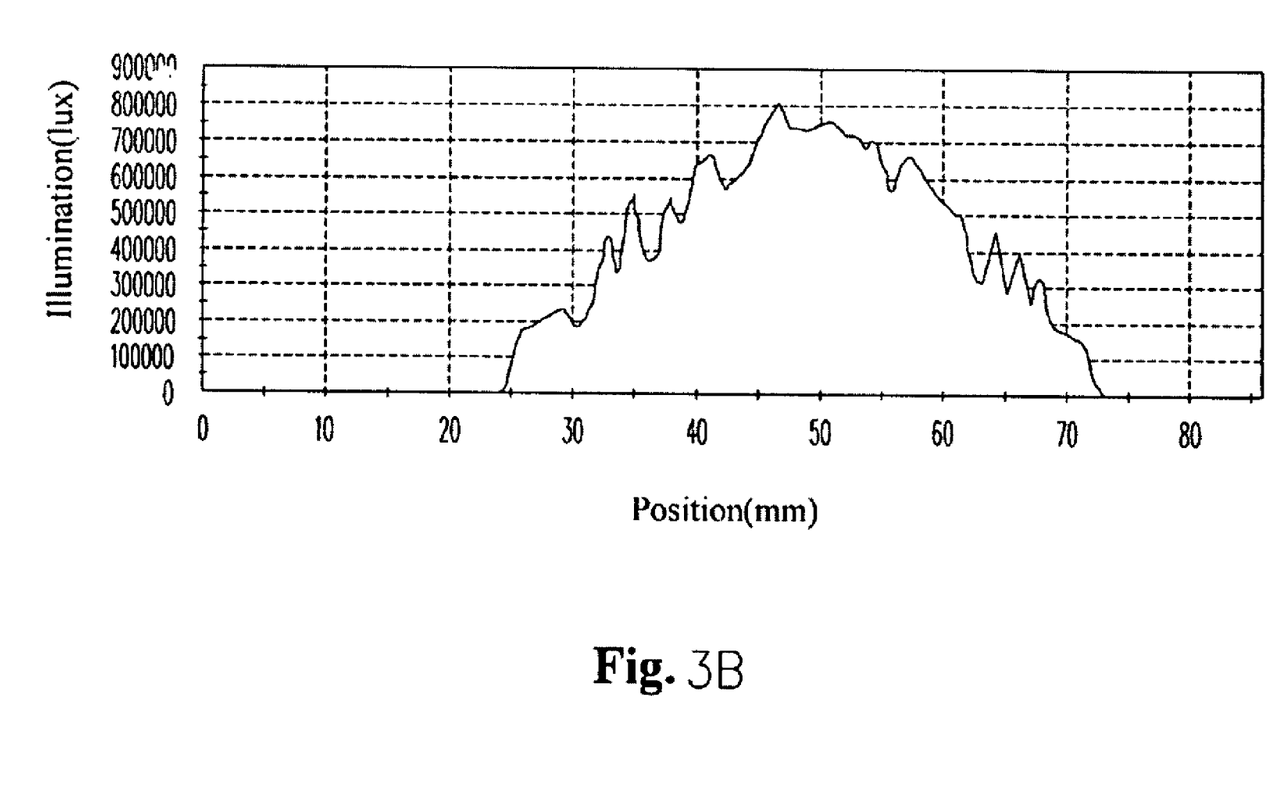
FIG. 3B is another illumination distribution of the light spot in a condition different from FIG. 3A.

In the embodiment, the light transmissive opening 232 of the reflective layer 230 may be made by laser drilling technique. Specifically, before the laser drilling process, the reflective layer 230 is entirely distributed on the second surface 214. Later, the laser beams parallel to each other emit to lens 220 from the right upside of the BEF 200 in FIG. 1A, that is, the laser beams emit to lens 220 along the direction perpendicular to the first direction D1 and the second direction D2. As a result of the concentration of the lens 220, the light spot formed on the reflective layer 230 by the laser beam is at the position of the light transmissive opening 232, and the illumination distribution of the light spot is described as FIG. 3A. As shown in FIG. 3A, because the illumination distribution of the light spot is uniform, so long as the power of the laser beam is big enough, the light transmissive opening 232 as big as the light spot may be drilled out at the reflective layer 230, and the illumination distribution of the light spot is formed on condition of the BEF 200 satisfying $L<nR_1/(n-1)$ and $L<nR_2/(n-1)$. Thus only once drilling action using the parallel laser beam, the light transmissive openings 232 having prospective size and position may be drilled out, so the design of the BEF 200 of the embodiment may simplify the manufacture process and reduce the cost of the backlight module 100. Contrarily, if the BEF 200 satisfies $L>nRi/(n-1)$ and $L>nR_2/(n-1)$, the illumination distribution of the light spot is distributed as FIG. 3B. As shown in FIG. 3B, the illumination of the light spot in the center is higher than the illumination of the light spot around the center, the distribution of the energy has no obvious boundary, and the size of the light transmissive opening 232 is hard to control, so that the size of the light transmissive opening 232 is smaller than the size of the light spot, and the size of the light transmissive 232 may not satisfy the prospective size. As a result, the incident angle of the laser beam may be modified to drill several times to make the size and the position of the light transmissive opening 232 satisfy the prospective size and position. So the manufacture process may be too complicated, and the manufacture cost and manufacture time may be increased.

Moreover, the condition of making the BEF 200 satisfy $L<nRi/(n-1)$ and $L<nR_2/(n-1)$ may also make the light beam 112 transmitted through the BEF 200 more uniform. In the embodiment, the BEF 200 satisfies $L<0.95nRi/(n-1)$ and $L<0.95nR_2/(n-1)$ to further improve the uniformity of the light beam 112 transmitted through the BEF 200.

In order to make the BEF 200 have better light efficiency, the BEF 200 may further include a light transmissive layer 240 covering the reflective layer 230 and being filled in the light transmissive openings 232. The process forming the light transmissive layer 240 may be after the laser drilling process. In the embodiment, the light transmissive layer 240 is disposed between the reflective layer 230 and the optical unit 300. The light transmissive layer 240 may make the light beam 112 be refracted (for example refracted by the interface between the air and the light transmissive layer 240) before transmitting into the light transmissive layer 232 to minimize the incident angle, so that the situation of the light beam 112 emitting to another lens 220 besides the lens 220 corresponding to the light transmissive opening 232 may be reduced and the efficiency of the BEF 200 may be improved. Thus the backlight module 100 may have higher light efficiency. In the embodiment, the refractive index of the light transmissive layer 240 is, for example, in the range of from 1.45 to 1.6, the refractive index of the light guide plate 310 is, for example, 1.5, the refractive index of the air is, for example, 1, and the refractive index of the light transmissive substrate and the refractive index of the lens 220 may be the same. However, in other embodiment, the BEF 200 may not have the above mentioned light transmissive layer 240.

Figure 4A:
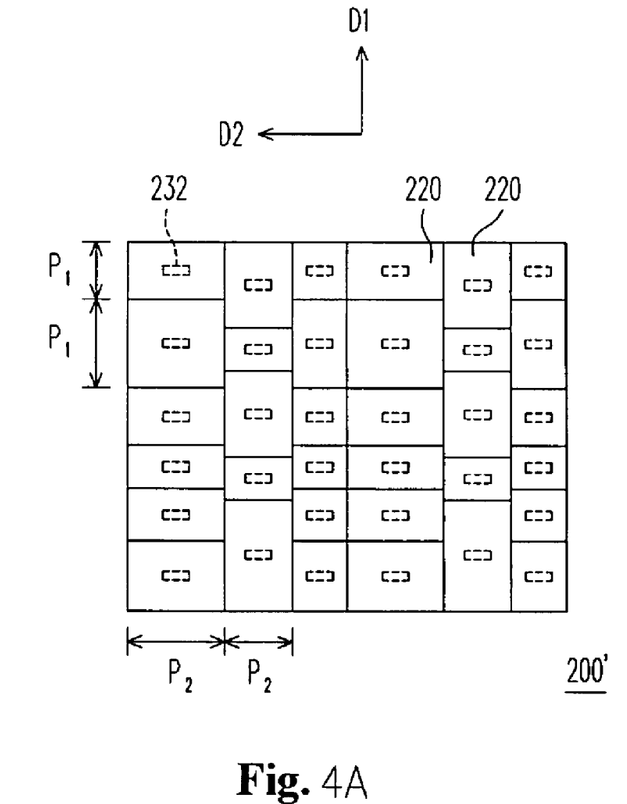
FIG. 4A is a bottom view diagram of the BEF according to another embodiment of the invention.

Referring to FIG. 4A, the BEF 200' of the embodiment is similar to the BEF 200 in FIG. 2B, and the differences are described as below. In the BEF 200' of the embodiment, the widths $P_1$ of at least a part of the lenses 220 are not the same in the first direction D1. The ratio of the maximum value of the widths $P_1$ of the lenses 220 to the minimum value of the widths $P_1$ of the lenses 220 in the first direction D1 is between 1 and 4. Besides, in the embodiment, the widths $P_2$ of at least a part of the lenses 220 are not the same in the second direction D2. The ratio of the maximum value of the widths $P_2$ of the lenses 220 to the minimum value of the widths $P_2$ of the lenses 220 in the second direction D2 is between 1 and 4. Designing the size and the position of the lens 220 irregularly may reduce the moiré phenomenon between the BEF 200' and the liquid crystal panel (not shown) disposed on the BEF 200'.

Figure 4B:
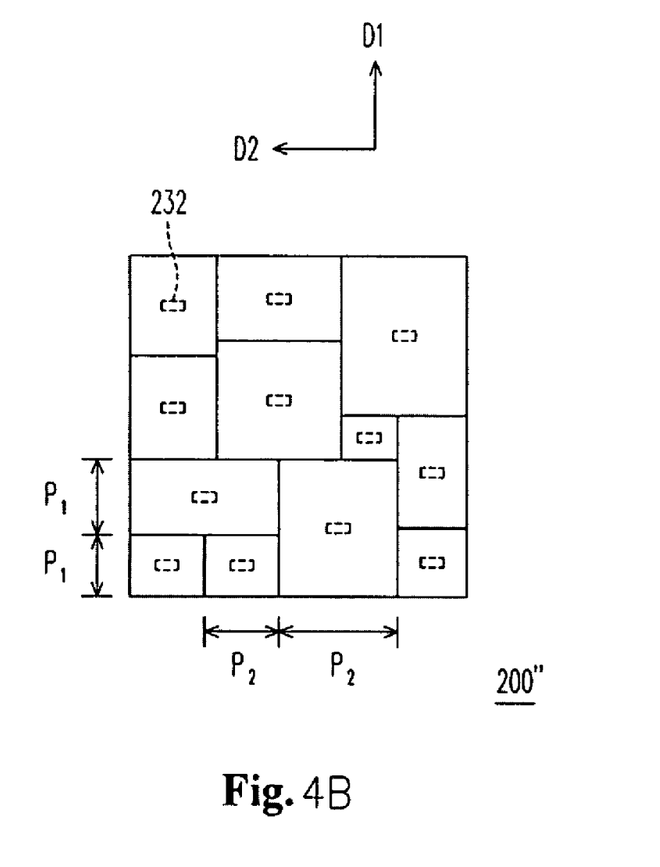
FIG. 4B is a bottom view diagram of the BEF according to another embodiment of the invention.

Referring to 4A and 4B, the differences of the BEF 200" (as described in FIG. 4B) of the embodiment and the BEF 200' (as described in FIG. 4A) are shown as below. The widths $P_2$ of the lenses 220 in the same line of the BEF 200' are substantially the same in a direction (for example, the first direction D1), and the widths $P_1$ of the lenses 220 in the same line of the BEF 200' are at least partially the same in another direction (for example, the second direction D2). However, in the first direction D1 or in the second direction D2, the widths $P_1$ or the widths $P_2$ of the lenses 220 in the same line of the BEF 200" are both at least partially not the same. The BEF 200" has higher irregularity, and thus the BEF 200' may be manufactured and designed easily.

Figure 5:
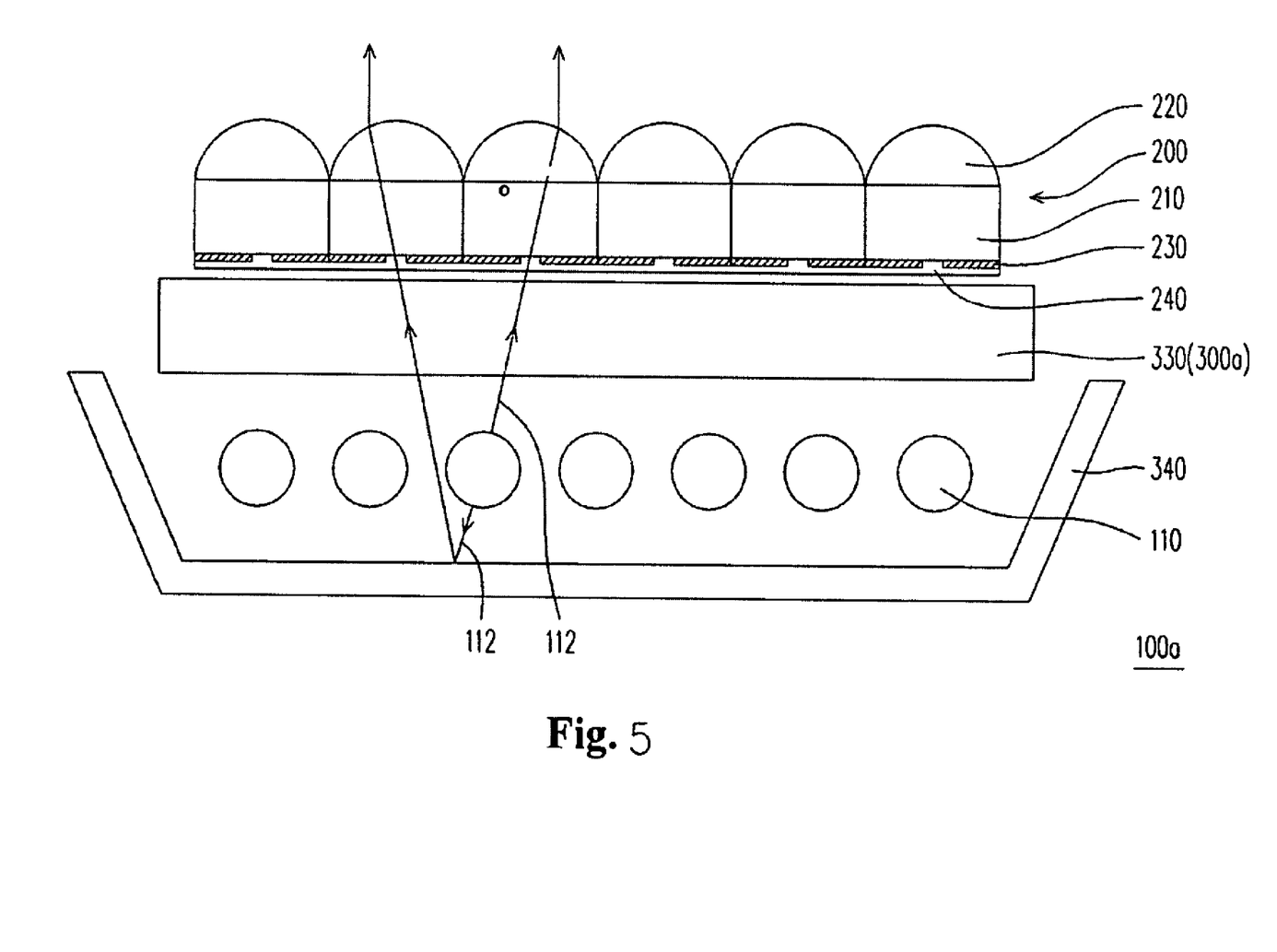
FIG. 5 is a cross-sectional diagram of the backlight module according to another embodiment of the invention.

Referring to FIG. 5, the backlight module 100a of the embodiment and the backlight module 100 are partially similar, and the differences between the backlight module 100a and the backlight module 100 are described as below. The backlight module 100 is side type backlight module, and the backlight module 100a is direct type backlight module. Specifically, the optical unit 300a includes a light diffusion plate 330, wherein the light diffusion plate 330 is disposed between the BEF 200 and a plurality of light emitting devices 110. That is one of the characters of the direct type backlight module. The light beams 112 emitted from the light emitting device 110s may transmit into the BEF 200 through the light diffusion plate 330 and be diffused by the diffusion plate 330. In the embodiment, the backlight module 100a further includes a lamp case 340, and a plurality of light emitting devices 110 are disposed in the lamp case 340. The inner wall of the lamp case 340 has reflective function and may reflect the light beams 112 from the light emitting devices 110 to the light diffusion plate 330.

In conclusion, the embodiment or the embodiments of the invention may have at least one of the following advantages, in the BEF of the embodiment of the invention, for $R_1 \neq R_2$, the BEF may be used in the backlight module having different demands at the ranges of the light emitting angle in different directions. By appropriately designing the values of $R_1$ and $R_2$, the backlight module adopting the BEF may be applied to the display of all kinds of different equipments. Besides, the BEF of the embodiment of the invention satisfies $L<nR_1/(n-1)$ and $L<nR_2/(n-1)$, so in manufacturing process, when the parallel beams perpendicular to the first surface emit to lens by laser drilling technique, and the laser beams are concentrated to the reflective layer by the lenses and produce light spots, the illumination distribution of the light spots may be more uniform. Thus only once drilling action using the laser beam, the light transmissive openings having perspective size and position may be drilled out, so the BEF of the embodiment of the invention may simplify the manufacture process and further reduce the cost of the backlight module of the embodiment of the invention. Moreover, the condition of making the BEF satisfy $L<nRi/(n-1)$ and $L<nR_2/(n-1)$ may also make the light beam through the BEF more uniform, and make the backlight module of the embodiment of the invention provide more uniform surface light.

The foregoing description of the preferred embodiments of the invention has been ed for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A brightness enhancement film, comprising:
   a light transmissive substrate, having a first surface and a second surface opposite to the first surface;
   a plurality of lenses, disposed on the first surface, wherein each of the lenses has a curved protruding surface facing away from the light transmissive substrate, the radius of curvature of the curved protruding surface in a first direction parallel to the first surface is R1, the radius of curvature of the curved protruding surface in a second direction parallel to the first surface is R2, and R1≠R2; and
   a reflective layer disposed on the second surface, wherein the reflective layer has a plurality of light transmissive openings, the light transmissive openings are respectively located on the optical axes of the lenses, and the distance between the apex of the curved protruding surface of the lens and the corresponding light transmissive opening is L, the refractive index of the lenses is n, and the brightness enhancement film satisfies $L<nR1/(n-1)$ and $L<nR2/(n-1)$.

2. The brightness enhancement film according to claim 1, wherein the first direction is substantially perpendicular to the second direction.

3. The brightness enhancement film according to claim 1, wherein the widths of the light transmissive openings in the first direction are not the same as the widths of the light transmissive openings in the second direction.

4. The brightness enhancement film according to claim 1, wherein the width of the light transmissive opening in the first direction is $A_1$, the width of the light transmissive opening in the second direction is $A_2$, the width of the curved protruding surface corresponding to the light transmissive opening in the first direction is $P_1$, the width of the curved protruding surface corresponding to the light transmissive opening in the second direction is $P_2$, and the brightness enhancement film satisfies $0.1<A_1/P_1<0.9$ and $0.1<A_2/P_2<0.9$.

5. The brightness enhancement film according to claim 1, wherein the widths of at least a part of the lenses are not the same in the first direction.

6. The brightness enhancement film according to claim 5, wherein the ratio of the maximum value of the widths of the lenses to the minimum value of the widths of the lenses in the first direction is between 1 and 4.

7. The brightness enhancement film according to claim 5, wherein the widths of at least a part of the lenses are not the same in the second direction.

8. The brightness enhancement film according to claim 7, wherein the ratio of the maximum value of the widths of the lenses to the minimum value of the widths of the lenses in the second direction is between 1 and 4.

9. The brightness enhancement film according to claim 1, further comprising a light transmissive layer covering the reflective surface and being filled in the light transmissive openings.

10. The brightness enhancement film according to claim 1, wherein the brightness enhancement film satisfies $L<0.95nR_1/(n-1)$ and $L<0.95nR_2/(n-1)$.

11. A backlight module, comprising:
at least one light emitting device, capable of emitting a light beam;
the brightness enhancement film according to claim 1, disposed in the transmission path of the light beam; and
an optical unit, disposed in the transmission path of the light beam between the light emitting device and the brightness enhancement film.

12. The backlight module according to claim 11, wherein the optical unit comprises a light guide plate, the light guide plate has a third surface, a fourth surface opposite to the third surface, and a incident surface connecting the third surface and the fourth surface, the reflective layer is located between the light transmissive substrate and the third surface, and the light emitting device is disposed besides the incident surface.

13. The backlight module according to claim 11, wherein the first direction is substantially perpendicular to the second direction.

14. The backlight module according to claim 11, wherein the widths of the light transmissive openings in the first direction are not the same as the widths of the light transmissive openings in the second direction.

15. The backlight module according to claim 11, wherein the width of the light transmissive opening in the first direction is $A_1$, the width of the light transmissive opening in the second direction is $A_2$, the width of the curved protruding surface corresponding to the light transmissive opening in the first direction is $P_1$, the width of the curved protruding surface corresponding to the light transmissive opening in the second direction is $P_2$, and the brightness enhancement film satisfies $0.1<A_1/P_1<0.9$ and $0.1<A_2/P_2<0.9$.

16. The backlight module according to claim 11, wherein the widths of at least a part of the lenses are not the same in the first direction.

17. The backlight module according to claim 16, wherein the ratio of the maximum value of the widths of the lenses to the minimum value of the widths of the lenses in the first direction is between 1 and 4.

18. The backlight module according to claim 16, wherein the widths of at least a part of the lenses are not the same.

19. The backlight module according to claim 18, wherein the ratio of the maximum value of the widths of the lenses to the minimum value of the widths of the lenses in the second direction is between 1 and 4.

20. The backlight module according to claim 11, wherein the brightness enhancement film further comprises a light transmissive layer covering the reflective surface and being filled in the light transmissive openings, and the light transmissive layer is disposed between the reflective surface and the optical unit.

* * * * *